H. C. HAMMOND.
STRAINER FOR MILK PAILS.
APPLICATION FILED SEPT. 4, 1912.
1,051,735.
Patented Jan. 28, 1913.
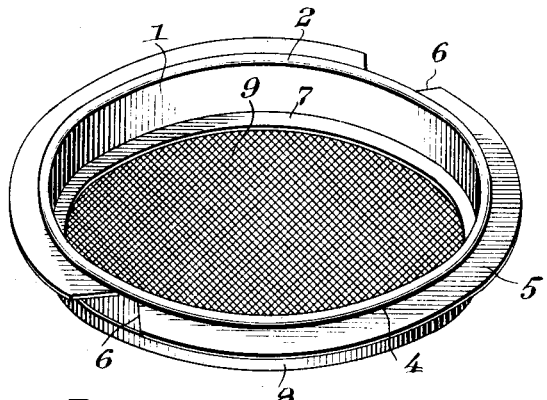
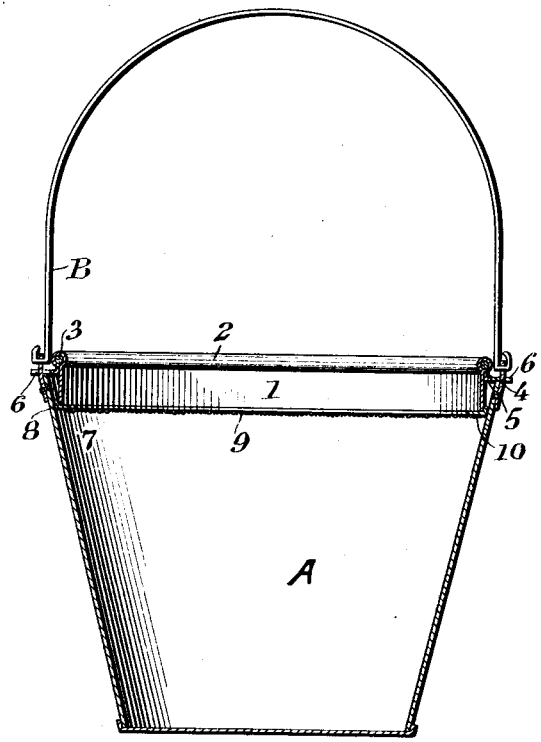
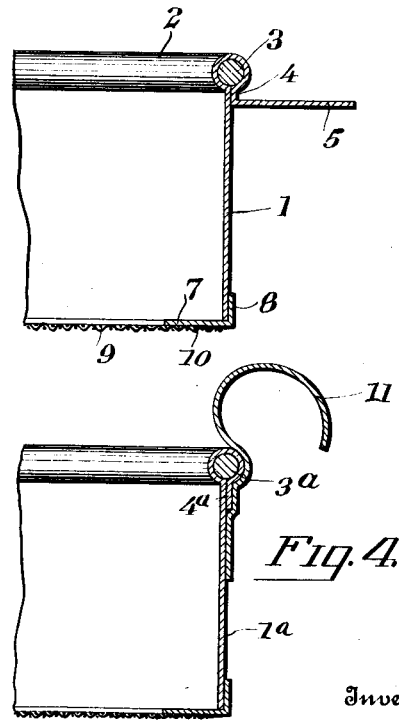
Inventor
H. C. Hammond

UNITED STATES PATENT OFFICE.

HENRY C. HAMMOND, OF DARIEN, WISCONSIN.

STRAINER FOR MILK-PAILS.

1,051,735.  Specification of Letters Patent.  Patented Jan. 28, 1913.

Application filed September 4, 1912. Serial No. 718,532.

*To all whom it may concern:*

Be it known that I, HENRY C. HAMMOND, a citizen of the United States, residing at Darien, in the county of Walworth and State of Wisconsin, have invented new and useful Improvements in Strainers for Milk-Pails, of which the following is a specification.

This invention relates to strainers for milk pails and has for its objects to provide a device of this character which is sanitary; one wherein will be included a foraminous straining cloth of a gage that will collect the incoming body of milk and break the same in such manner that will prevent the accumulation of froth upon the surface of said material and eliminate the splashing of the milk over the side of the pail, and further, the provision of a guarding flange to assist in the purpose of the foraminous material toward preventing the milk from splashing.

Another object of the invention is to provide a device which will be simple, strong and durable and inexpensive to manufacture and capable of attachment to the pail in a manner which will prevent its accidental derangement therefrom during the milking operation.

In the drawing forming a portion of this application, and in which like letters of reference indicate similar parts in the several views:—Figure 1 is a perspective view of the strainer. Fig. 2 is a vertical section through a pail showing the application of the strainer thereto. Fig. 3 is a section on an enlarged scale through a portion of the strainer. Fig. 4 is a view similar to Fig. 3 showing a slightly modified form of the invention.

With a view to providing a straining attachment that may be connected with milk pails of well known construction and associated therewith so as to guard against the introduction of waste or foreign matter into the pail I provide a circular frame or body member 1 which is constructed of a single piece of sheet material whose upper edge is rolled at 2 over a reinforcing ring 3. At 4 the folded portion of the material is secured to the main body portion of the member 1 and then extended outwardly to present a supporting flange 5 which is adapted to engage against the upper edge of the pail A as shown in Fig. 2 whereby to support the device in operative position thereon as is evident. At diametrically opposite points the flange 5 is provided with spaces 6 to accommodate the bail B of the pail and to permit the bail to be adjusted to a position where it will lie substantially upon a portion of the flange 5 during the milking operation.

A cloth attaching member of substantially flat ring form is illustrated at 7 and disposed at the lower end of the member 1 and provided with a reinforcing portion 8 which embraces the lower walls of the main body of the member 1, being permanently secured thereto by solder or the equivalent thereof. A straining cloth 9 extends entirely across the lower open end of the member 1 and it is preferably soldered or otherwise suitably secured at 10 to the underside of the ring 7. The material of which the cloth 9 is formed is of a very thin gage or mesh preferably whereby the incoming milk will be thoroughly broken up and thereby held against undue agitation with the elimination of froth upon the upper surface of the cloth. The cloth is also of such character as will positively prevent hair or foreign particles which may fall from the cow from passing into the pail during the milking operation.

In the modified form of the invention shown in Fig. 4 the main body member 1ª of the device has its upper portion rolled over a reinforcing ring 3ª and then secured permanently at 4ª to the member 1ª. In this form of the invention a suitable number of hooks such as the one shown at 11 may be substituted for the flange 5. The hooks may be arranged at any desired intervals so as to effect a proper attachment of the device to the pail.

Reinforcing the upper and lower portions of the main body member 1 through the medium of the elements 3 and 7 strengthens the main body member and positively prevents the latter from being distorted under careless handling.

I claim:—

A strainer for milk pails comprising a circular frame adapted to fit within the upper end of a pail and provided with a rolled upper portion, a reinforcing ring confined in the rolled portion, the said rolled portion being terminally extended laterally beyond the vertical walls of said member and adapted to rest upon the upper edge of the pail, a substantially flat ring at the lower end of said member, the said second ring having a flange embracing and secured to the lower walls of said member, and a straining cloth secured to said second ring.

In testimony whereof I affix my signature in presence of two witnesses.

HENRY C. HAMMOND.

Witnesses:
R. S. YOUNG,
HAROLD DODGE.